United States Patent
Li et al.

(10) Patent No.: US 6,747,923 B2
(45) Date of Patent: Jun. 8, 2004

(54) TRACKING LOCATION ADJUSTMENT METHOD IN AN OPTICAL STORAGE DEVICE

(75) Inventors: Sung-Hung Li, Junghe (TW); Yi-Lin Lai, Keelung (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 10/158,831

(22) Filed: Jun. 3, 2002

(65) Prior Publication Data

US 2003/0035351 A1 Feb. 20, 2003

(30) Foreign Application Priority Data

Aug. 16, 2001 (TW) ........................................ 90120154 A

(51) Int. Cl.$^7$ ................................................. G11B 7/00
(52) U.S. Cl. .................................................... 369/44.28
(58) Field of Search ........................... 369/30.17, 44.28, 369/44.27, 44.29, 44.34, 30.13, 30.15, 30.1

(56) References Cited

U.S. PATENT DOCUMENTS 5,487,055 A * 1/1996 Suzuki .................... 369/44.17
5,623,461 A * 4/1997 Sohmuta .................. 369/44.17

FOREIGN PATENT DOCUMENTS

TW          087102002          2/1987

* cited by examiner

Primary Examiner—Nabil Hindi
(74) Attorney, Agent, or Firm—Rabin & Berdo, P.C.

(57) ABSTRACT

The invention provides a method of adjusting a tracking location in an optical storage device. The method is illustrated as follows. Firstly, the optical pickup head reaches the first tracking location according to a tracking error (TE) signal. Secondly, the optical pickup head is finely moved to an adjusted tracking location where the value of the amplitude of RFRP signal is maximum. The method can avoid wrong tracking location by simply based on the TE signal, then enable the optical pickup head to reach the correct track center and improve the quality of data reading.

19 Claims, 4 Drawing Sheets

TRACKING LOCATION ADJUSTMENT METHOD IN AN OPTICAL STORAGE DEVICE

This application incorporates by reference Taiwanese application Serial No. 090120154, Filed Aug. 16, 2001.

BACKGROUND OF THE INVENTION

1. Field of the Invention

The invention relates to a tracking location adjustment method in an optical storage device, and more particularly to a tracking location adjustment method according to a Tracking Error (TE) signal and a Radio Frequency Ripple (RFRP) signal in an optical storage device.

2. Description of Related Art

FIG. 1 schematically illustrates a structure of a general optical storage device. The optical storage device could be a Compact Disk-Read Only Memory drive (CD-ROM drive) or a Digital Versatile Disk drive (DVD drive) or the like. In FIG. 1, a spindle motor 100 rotates a disc 101 at a required speed. A sled driving motor 102 is for driving a sled 105 having an optical pickup head 104 to proceed rough tunings, for example track-jumping and seeking operations. The disc 101 has multiple tracks 103 for recording data. So, in a seeking operation, the optical pickup head 104 is moved to the desired track for reading information. In addition, there are fine tuning operations including for example, focusing and tracking. In a focusing operation, the lens 120 is moved vertically and reads the information on the disc 101 correctly. In a tracking operation, the lens 120 follows the desired track horizontally. Afterward, a laser beam is emitted on the disc 101, and then the optical sensor on the optical pickup head can receive analog signal reflected from the disc 101.

A pre-amplifier 106 synthesizes signals, which are obtained through the optical pickup head, into the Radio Frequency (RF) signal and other necessary signals for different servo controls, such as the Tracking Error (TE) signal and the Radio Frequency Ripple (RFRP) signal, and so on. The RF signal is also transmitted to a control circuit 108 including a Digital Signal Processor (DSP), and other analogue or digital circuits. The RF signal is corrected and interpreted by the control circuit 108 into data, then transmitted to a decoder 112. Then, the output from the decoder 112 is transmitted to a host computer 114 for further process. On the other hand, the control circuit 108 also transmits servo signals to power amplifiers 116 & 118 for activating the spindle motor 100, the sled motor 102, the focusing actuator of the lens 120 on the optical pickup head 104, and a tracking actuator. In addition, a microprocessor 122 is in charge of the whole processing control of the optical storage device and user interfaces, such as opening of the disc tray and so on.

The optical pickup head 104 reads the data on the disc 101 by emitting three beams: a main beam, and two sub-beams at the same time, and then decodes reflected signals. The reflected signal related to by the main beam is defined as the RF signal, the reflected signal related to one sub-beam is defined as the signal E, and the reflected signal related to the other sub-beam is defined as the signal F. The two sub-beams are separately located on both sides of the main beam. The distance between the two sub-beams is ½ of the beam's wavelength. So, the phase difference between the two sub-beams is 180 degree. FIG. 2 is a timing diagram of signals in an optical storage device. When the main beam focuses on a track, the amplitude of the RF signal is maximum. When the main beam focuses between tracks, the amplitude of the RF signal is minimum. The difference between the upper envelope and the lower envelope of the RF signal is defined the RFPR signal. Or, the filtered RF signal via a low-pass filter is also defined as the RFRP signal. The TE signal is defined as the difference between the value of the signal E and the signal F. At the timing point T2, the value of TE signal is 0, which means the main beam is focused on a track center. However, the value of signal TE is also 0 if the main beam focuses between tracks, such as at the timing point T4. When the lens is located at the edge of tracks, the absolute value of TE signal is maximum, such as at the timing point T1 and T3.

Therefore, a complete cycle of signal TE or signal RF means the optical pickup head passes through one track. The tracking ability of an optical storage device can influence the quality and precision of reading data on a disc. Traditionally, the zero-crossing point of TE signal is used to identify if a tracking process has been done. However, the phase difference between the signal E and the signal F is not ideally 180 degrees. The possible error of the phase difference can reach 45 degrees. For this reason, it will cause incorrect tracking location and poor quality of signal reading if the tracking location is decided only according to zero-crossing point of the TE signal.

SUMMARY OF THE INVENTION

It is therefore an objective of the invention to provide a method of tracking location adjustment in an optical storage device.

In accordance with the foregoing objective and other objectives of the invention, the invention provides a method of tracking location adjustment in an optical storage device for finely moving an optical pickup head to track on an adjusted tracking location. The method is illustrated as follows. Firstly, the optical pickup head reaches the first tracking location according to a tracking error (TE) signal. Secondly, the optical pickup head is finely moved to an adjusted tracking location where the value of the amplitude of RFRP signal is maximum. The method can avoid wrong tracking location by simply based on the TE signal, then enable the optical pickup head to reach the correct track center and improve the quality of data reading.

The invention can be more fully understood by reading the following detailed description of the preferred embodiments, with reference made to the accompanying drawings.

DETAILED DESCRIPTION OF THE INVENTION

When an optical pickup head 104 emits a main beam right on a track center, the amplitude of the Radio Frequency Ripple (RFRP) signal is maximum. According to this feature, the invention can adjust the tracking location of the pickup head based on both the TE signal and the RFRP signal.

Figure 1:
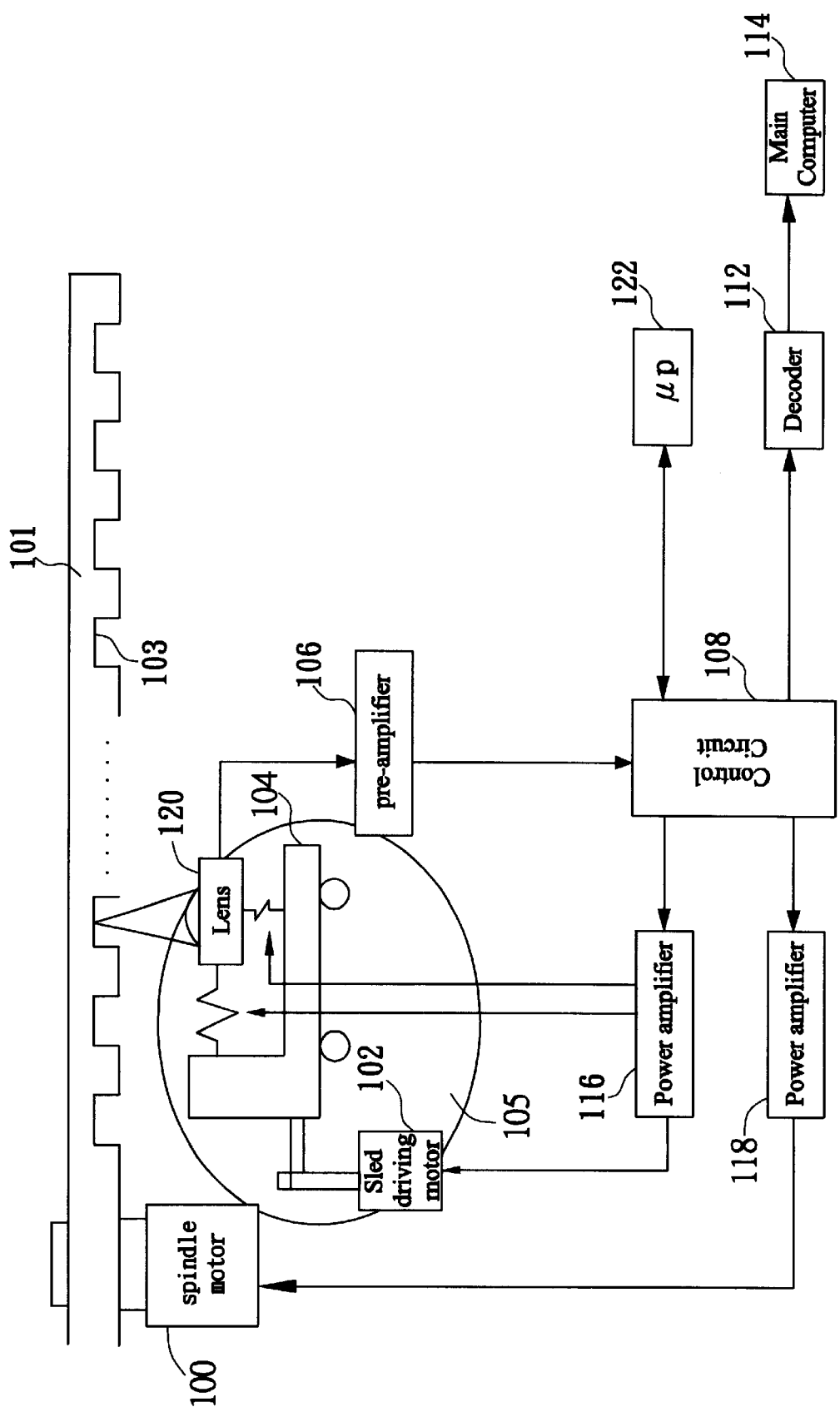
FIG. 1 is a block diagram of the system structure of an optical storage device.
Figure 2:
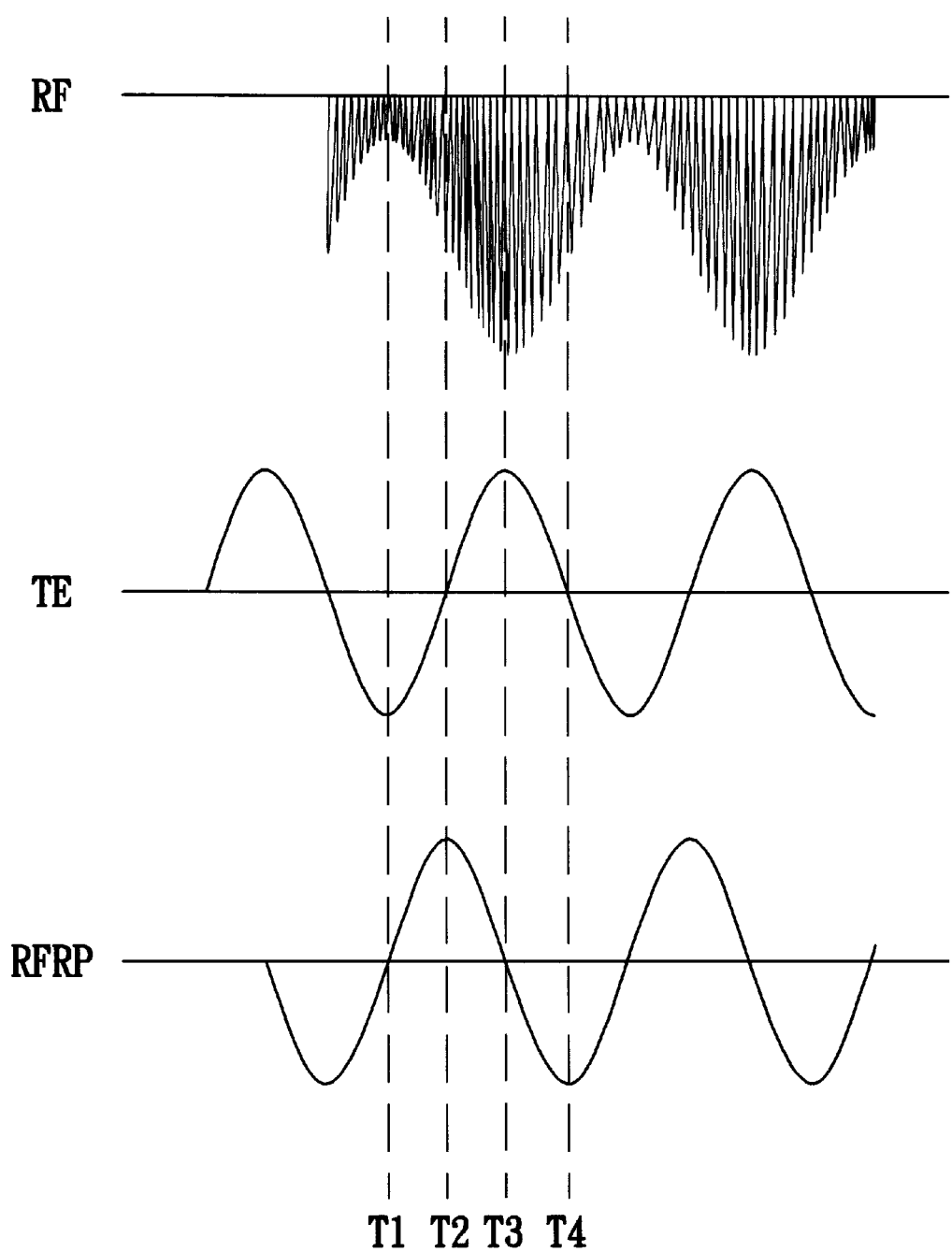
FIG. 2 illustrates a timing diagram in an optical storage device.
Figure 3:
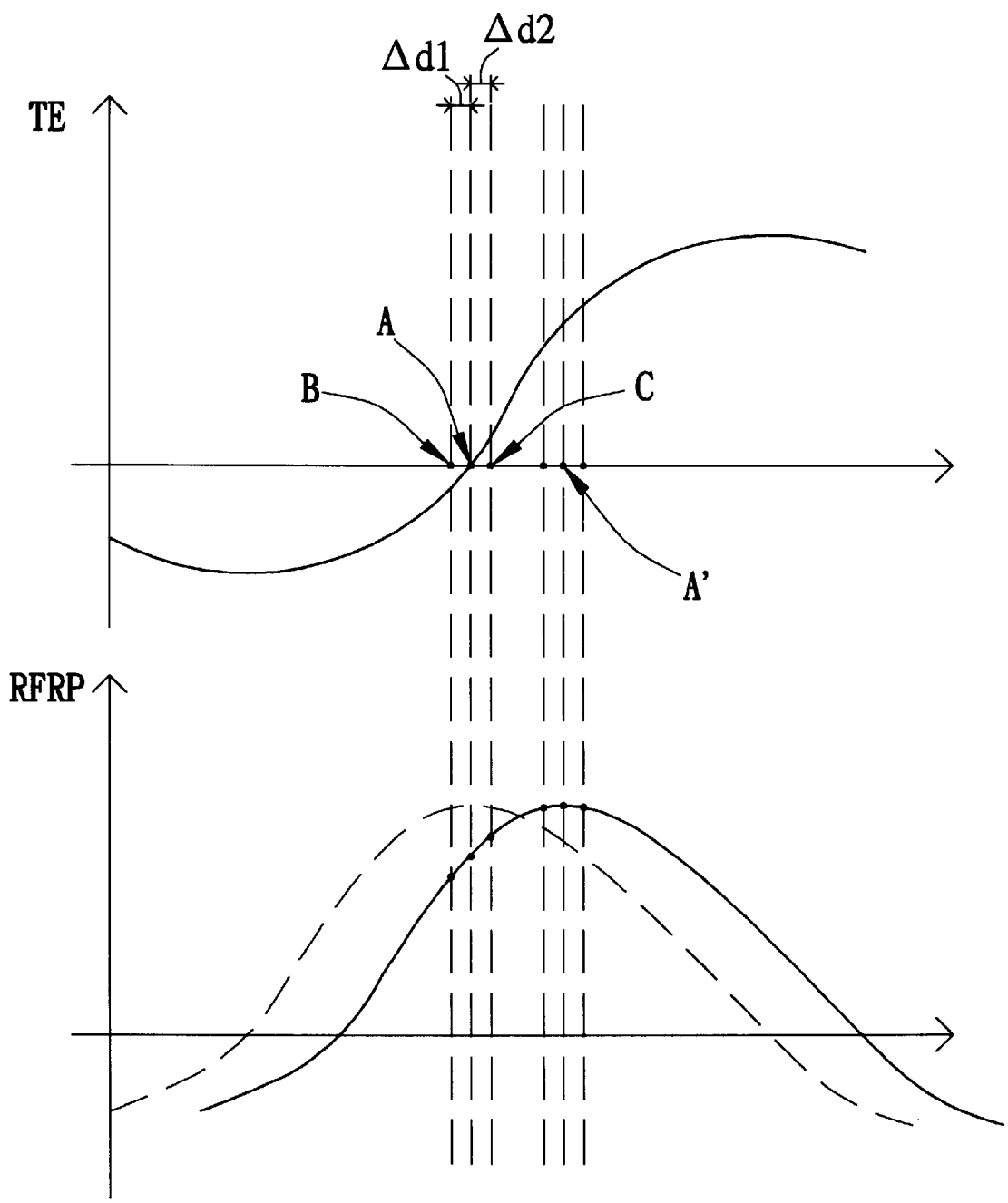
FIG. 3 illustrates a timing diagram of the TE signal and the RFRP signal.

FIG. 3 illustrates the timing diagram of the TE signal and the RFRP signal. The theoretical waveform of the RFRP signal is the dotted-line curve shown in FIG. 3. Theoretically, when the amplitude of RFRP signal is maximum, the TE signal should be 0. In fact, the full-line curve in FIG. 3 is the real waveform of the RFRP signal. Since the phase difference between the signal E and the signal F is not ideally 180 degree, the amplitude of the RFRP signal may be not maximum when the value of the TE signal is 0, as shown at location A in FIG. 3. It means that the main beam does not radiate the center of the target track. Therefore, if the judgment of a good tracking location is only based on the zero-cross point of the TE signal, it will cause poor access quality.

Figure 4:
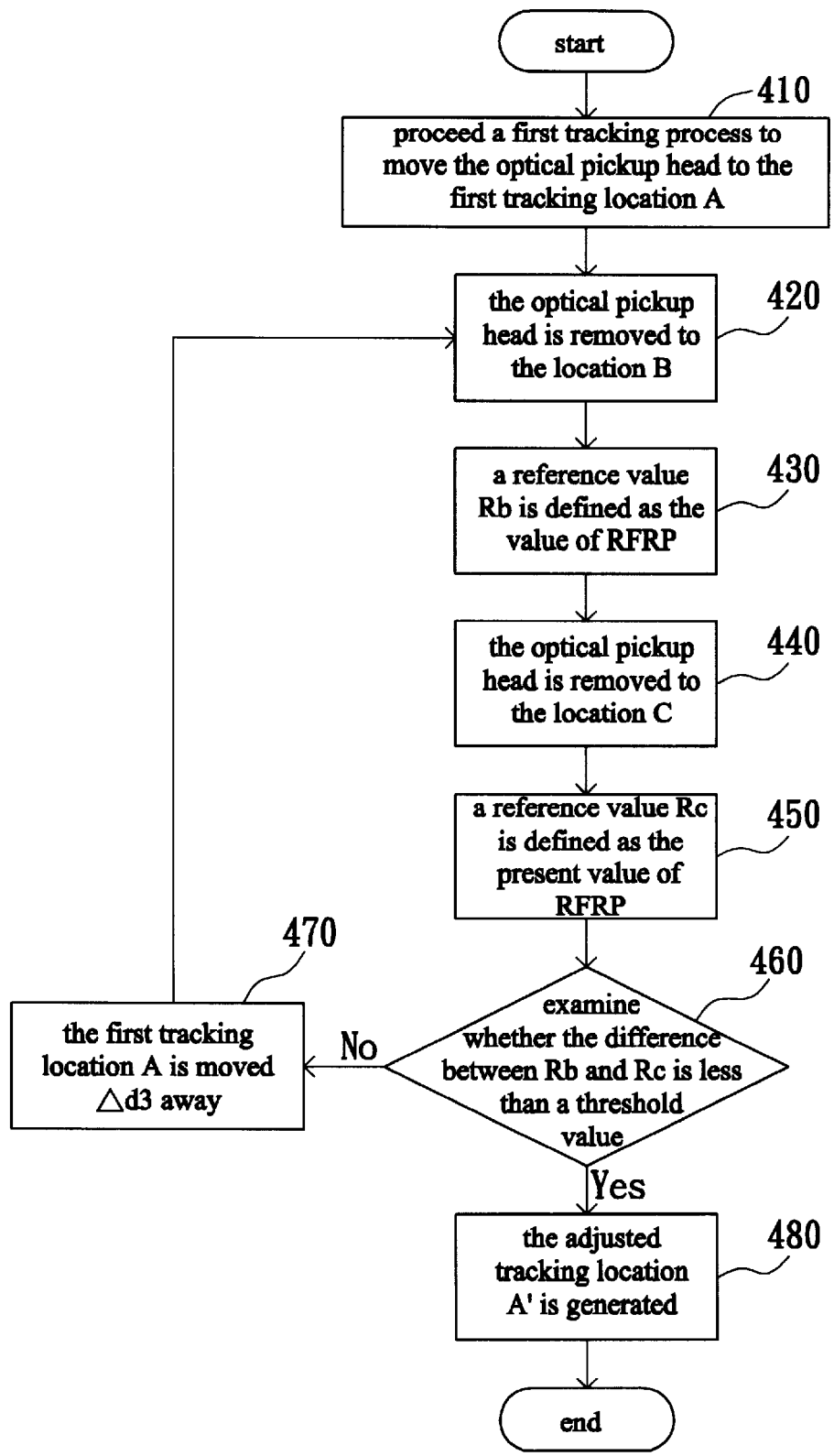
FIG. 4 illustrates the tracking location adjustment method according to the preferred embodiment of the invention.

Please refer to FIG. 4, which illustrates the tracking location adjustment method in an optical storage device, according to the preferred embodiment of the invention. Firstly, a normal tracking process is performed to move the optical pickup head 104 to the first tracking location A according to the tracking error (TE) signal, as shown in step 410. Then, a tracking location adjustment is performed according to the Radio Frequency Ripple (RFRP) signal. That is to proceed fine adjustment on the tracked location in order to move the optical pickup head 104 to an adjusted tracking location A' with maximum RFRP signal, as shown from step 420 to step 480. The first tracking location A is determined according to the zero-cross point of the TE signal. The process of tracking location adjustment is to finely adjust the first tracking location A to the location where the amplitude of the RFRP signal reaches a maximum.

The judgment of a maximum RFRP signal in the tracking location adjustment is to compare if the difference between two adjacent RFRP signals of the current RFRP signal on opposite direction is smaller than a threshold value. If yes, the adjusted tracking location A' can be determined, that is, the current RFRP signal is considered as maximum. The tracking location adjustment includes the following steps: Firstly, a location away from the first tracking location by $\Delta d1$ along a first direction, is defined as a location B. And then the optical pickup head is moved to the location B, as shown at step 420. A reference value Rb is defined as the present value of the RFRP signal, as shown at step 430. In addition, a location away from the first tracking location A by $\Delta d2$ along a second direction (opposite to the first direction), is defined as a location C. And the optical pickup head 104 is also moved to the location C, as shown at step 440. Then a reference value Rc is defined as the present value of the RFRP signal, as shown at step 450. Afterward, it is examined whether the difference between Rb and Rc is less than a threshold value, as shown at step 460. If yes, it means the first tracking location A is at the location with maximum RFRP. That is, the first tracking location A is regarded as the adjusted tracking location A', as shown at step 480. Then, the method is finished. If the difference between Rb and Rc is not less than a threshold value, then the step 470 is followed. At step 470, the pickup head is moved to another tracking location away from the first tracking location A by $\Delta d3$, and then the flow returns to step 420 to continuously search for the location with maximum RFRP. The amount of the distance $\Delta d3$ can be decided by designers. The direction of the predetermined distance $\Delta d3$ is decided by the bigger one of the reference Rb and the reference Rc. That is, if the reference Rb is bigger than the reference Rc, the direction of the predetermined distance $\Delta d3$ is the same with the direction of the predetermined distance $\Delta d1$. If the reference Rc is bigger than the reference Rb, the direction of the predetermined distance $\Delta d3$ is the same with the direction of the predetermined distance $\Delta d2$.

In summary, the invention provides a tracking location adjustment method used in an optical storage device. The method can avoid wrong tracking location caused by the error of TE signal, and thus enable the optical pickup head to reach the correct track and improve the quality of data reading. The invention is suitable for many optical storage devices, such as CD-ROM (compact disk read-only memory) drive, CD-R/RW (re-writable CD) drive, DVD-ROM (digital versatile disk read-only memory) drive and the like. The TE signal and the RFRP signal can be regarded as the track-crossing signals.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A tracking location adjustment method in an optical storage device having an optical pickup head, the method comprising:
    (a) moving the optical pickup head to a first tracking location according to a first track-crossing signal; and
    (b) deciding whether to move the optical pickup head to an adjusted tracking location related to the first tracking location according to a second track-crossing signal, the step (b) including
        (b1) moving the optical pickup head in a first direction away from the first tracking location to a first adjustment location, and defining the value of the second track-crossing signal as a first reference value;
        (b2) moving the optical pickup head in a second direction away from the first tracking location to a second adjustment location, and defining the value of the second track-crossing signal as a second reference value; and
        (b3) defining the first tracking location as the adjusted tracking location if the difference between the first reference value and the second reference value is less than a threshold value.

2. The method according to claim 1, wherein, in the step (b3), when the first reference value is bigger than the second reference value, the optical pickup head is moved from the first tracking location a new distance in the first directions and this new distance defines the first adjustment location.

3. The method according to claim 1, wherein, in the step (b3), when the second reference value is bigger than the first reference value, the optical pickup head is moved from the first tracking location a new distance in the second direction, and this new distance defines the second adjustment location.

4. The method according to claim 1 wherein, the first direction is opposite to the second direction.

5. A The method according to claim 1, wherein the first track-crossing signal is a tracking error (TE) signal and the second track-crossing signal is a radio frequency ripple (RFRP) signal, and in the step (a), when the optical pickup head reaches the first tracking location, the TE signal is zero.

6. A tracking location adjustment method for an optical storage device with an optical pickup head, the method comprising:
    moving the optical pickup head to a first tracking location according to a TE signal; and deciding whether to move the optical pickup head to an adjusted tracking location according to a RIFRP signal by:
  (a) moving the optical pickup head to a first adjustment location away from the first tracking location along a first direction and defining the value of the RFRP signal at that moment as a first reference value;
  (b) moving the optical pickup head to a second adjustment location away from the first tracking location along a second direction and defining the value of the RFRP signal at that time as a second reference value; and
  (c) if the difference between the first reference value and the second reference value is less than a threshold value, defining the first tracking location as the adjusted tracking location; if not, moving the optical pickup head to a new location, and returning to the step (a).

7. The method according to claim 6, wherein when the optical pickup head reaches the first tracking location, the TE signal is zero.

8. The method according to claim 6, wherein in the step (c), when the first reference value is bigger than the second reference value, the optical pickup head is moved to the new location along the first direction and the new location is defined as the first adjustment location.

9. The method according to claim 6, wherein in the step (c), when the second reference value is bigger than the first reference value, the optical pickup head is moved to the new location along the second direction and the new location is defined as the second adjustment location.

10. The method according to claim 6, wherein the first direction is opposite to the second direction.

11. A tracking location adjustment method in an optical storage device having an optical pickup head, the method comprising:
  (a) moving the optical pickup head to a first tracking location according to a first track-crossing signal; and
  (b) deciding whether to move the optical pickup head to an adjusted tracking location related to the first tracking location according to a second track-crossing signal;
  wherein the first track-crossing signal is a tracking error (TE) signal and the second track-crossing signal is a radio frequency ripple (RFRP) signal, and in the step (a), when the optical pickup head reaches the first tracking location, the TE signal is zero.

12. The method according to claim 11, wherein the step (b) includes
  (b1) moving the optical pickup head in a first direction away from the first tracking location to a first adjustment location, and defining the value of the second track-crossing signal as a first reference value,
  (b2) moving the optical pickup head away in a second direction from the first tracking location to a second adjustment location, and defining the value of the second track-crossing signal as a second reference value, and
  (b3) defining the first tracking location as the adjusted tracking location if the difference between the first reference value and the second reference value is less than a threshold value.

13. The method according to claim 12, wherein, in the step (b3), when the first reference value is bigger than the second reference value, the optical pickup head is moved a new distance from the first tracking location in the first direction, and the new distance defines the first adjustment location.

14. The method according to claim 12, wherein, in the step (b3), when the second reference value is bigger than the first reference value, the optical pickup head is moved a new distance in the second direction away from the first tracking location, and the new distance defines the second adjustment location.

15. A tracking location adjustment method in an optical storage device having an optical pickup head, the optical storage device producing a tracking error (TE) signal and a radio frequency ripple (RFRP) signal, the method comprising the steps of:
  (a) moving the optical pickup head to a first tracking location according to the TE signal, wherein the TE signal is zero when the optical pickup head reaches the first tracking location; and
  (b) moving the optical pickup head from the first tracking location to an adjusted tracking location according to a maximum value of the RFRP signal.

16. The method according to claim 15, wherein the step (b) includes
  (b1) moving the optical pickup head in a first direction to a first adjustment location away from the first tracking location, and defining the value of the RFRP signal at that moment as a first reference value,
  (b2) moving the optical pickup head in a second direction away from the first tracking location to a second adjustment location and defining the value of the RFRP signal at that time as a second reference value, and
  (b3) if the difference between the first reference value and the second reference value is less than a threshold value, defining the first tracking location as the adjusted tracking location; if not, moving the optical pickup head to a new location, and returning to the step (b1).

17. The method according to claim 16, wherein in the step (b3), when the first reference value is bigger than the second reference value, the optical pickup head is moved in the first direction to the new location, and the new location is defined as the first adjustment location.

18. The method according to claim 16, wherein in the step (b3), when the second reference value is bigger than the first reference value, the optical pickup head is moved in the second direction to the new location and the new location is defined as the second adjustment location.

19. The method according to claim 16, wherein, the first direction is opposite to the second direction.

* * * * *